United States Patent [19]

Clohset et al.

[11] Patent Number: 5,761,527
[45] Date of Patent: *Jun. 2, 1998

[54] PCI BUS HARD DISK ACTIVITY LED CIRCUIT

[75] Inventors: Steven J. Clohset; William C. Galloway, both of Houston, Tex.

[73] Assignee: Compaq Computer Corporation, Houston, Tex.

[*] Notice: The term of this patent shall not extend beyond the expiration date of Pat. No. 5,623,691.

[21] Appl. No.: 811,321

[22] Filed: Mar. 4, 1997

Related U.S. Application Data

[63] Continuation of Ser. No. 339,402, Nov. 14, 1994, Pat. No. 5,623,691.

[51] Int. Cl.⁶ ........................................ H01J 3/00
[52] U.S. Cl. .................. 395/821; 395/835; 395/836; 395/281
[58] Field of Search ........................ 395/835, 836, 395/837, 838, 854, 853, 281, 282, 869, 868, 821

[56] References Cited

U.S. PATENT DOCUMENTS 5,214,762  5/1993  Bush et al. .
5,377,357  12/1994  Mishigaki et al. .
5,455,954  10/1995  Packer .
5,471,590  11/1995  Melo et al. .
5,506,997  4/1996  Maguite et al. .

*Primary Examiner*—Jack B. Harvey
*Assistant Examiner*—Raymond N. Phan
*Attorney, Agent, or Firm*—Pravel, Hewitt, Kimball & Krieger

[57] ABSTRACT

A computer system which includes a circuit to monitor the PCI bus master grant lines and provide a disk drive activity signal if an appropriate grant line is activated. The PCI bus master grant lines are combined with mask signals, so that the grant lines not associated with a PCI bus master such as a SCSI controller are ignored. If an unmasked grant line is activated, a down counter is loaded. While the counter is at a non-zero value, a disk drive activity signal is provided. This disk drive activity signal is combined with other disk drive activity signals to drive the disk drive activity LED.

12 Claims, 4 Drawing Sheets

PCI BUS HARD DISK ACTIVITY LED CIRCUIT

SPECIFICATION

This is a continuation of application Ser. No. 08/339,402 filed Nov. 14, 1994 now U.S. Pat. No. 5,623,691.

BACKGROUND OF THE INVENTION

1. Field of the Invention

The invention relates to a circuit for indicating hard disk activity, and particularly to hard disk activity when the hard disk controller does not provide a specific activity signal.

2. Description of the Related Art

The performance demands on personal computers are ever increasing. It has been determined that a major bottleneck in improving performance is the capability to perform input/output (I/O) operations. Processor speeds continue to increase at a great rate and memory speeds and architectures can partially keep pace. However, the speed of I/O operations, such as disk and local area network (LAN) operations, has not kept pace. The increasing complexity of video graphics used in personal computers is also demanding greater performance then can be conventionally provided.

Some of the problems were in the bus architecture used in IBM PC-compatible computers. The EISA architecture provided some improvement over the ISA architecture of the IBM PC/AT, but more performance was still required. To this end Intel Corporation, primarily, developed the Peripheral Component Interconnect (PCI) bus. The PCI bus is a mezzanine bus between the host or local bus in the computer, to which the processor and memory are connected, and the I/O bus, such as ISA or EISA. For more details on the PCI bus, reference to the PCI Standard Version 2.0, from the PCI Special Interest Group in care of Intel Corp., which is hereby incorporated by reference, is advised. The bus was designed to have a high throughput and to take advantage of the increasing number of local processors that support I/O functions. For example, most disk controllers, particularly SCSI controllers, and network interface cards (NICs) include a local processor to relieve demands on the host processor. Similarly, video graphics boards often include intelligent graphics accelerators to allow higher level function transfer. Typically these devices have the capability of operating as bus masters, to allow them to transfer data at the highest possible rates.

One feature users have requested in personal computers is a hard disk activity LED. This LED provides an indicator to the users that the hard disk drive is in use, allowing the users a rough measure of system activity and a warning not to turn off the computer system. Originally, the LED was provided directly on the hard disk drive and visible to the user. In later computer system designs, the hard disk drive was not visible, so alternative designs had to be developed. Various alternatives included remote installation of the previous LED and the use of light pipes. In one alternative, the address bus was monitored for accesses to the standard hard disk drive registers and a one shot was triggered on each access. The one shot then drove the activity LED. In later computer systems, IDE or integrated drive electronics hard disk drives started being used. The IDE standard connection includes a line which is provided for the disk drive to drive a remote activity LED. So the IDE standard specifically provided are LED activity line.

One other development was the use of multiple hard disk drives in a disk array, which was logically addressed by the computer system as a single disk. A disk array controller received the logical commands and provided physical commands to the multiple hard disk drives. The disk array controller provided a dedicated output signal indicating disk drive activity. In one embodiment this output signal was provided to a reserved line on the EISA bus, with the computer system monitoring this line to drive the activity LED.

Thus, solutions were provided for several cases, particularly IDE drives and those in disk arrays. But problems existed for SCSI drive systems, because no dedicated activity line is available on the SCSI bus, and further complicated if the SCSI controller is a PCI bus device, as again no dedicated activity line is available on the PCI bus. Therefore, if the computer system used a PCI bus-based SCSI hard disk controller, the user could not monitor hard disk drive activity because the disk drive activity LED could not be driven.

SUMMARY OF THE INVENTION

A computer system according to the present invention includes a circuit to monitor the PCI bus master grant lines and provide a disk drive activity signal if an appropriate grant line is activated. The PCI bus master grant lines are combined with mask signals, so that the grant lines not associated with a PCI bus master such as a SCSI controller are ignored. If an unmasked grant line is activated, a timer or counter is loaded and starts counting down to zero. While the counter is at a non-zero value, a disk drive activity signal is provided. This disk drive activity signal is combined with other disk drive activity signals, such as the IDE signal and the disk array controller signal, to drive the disk drive activity LED. In this manner the user can monitor activity of disk drives controlled by a PCI-based SCSI bus controller.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
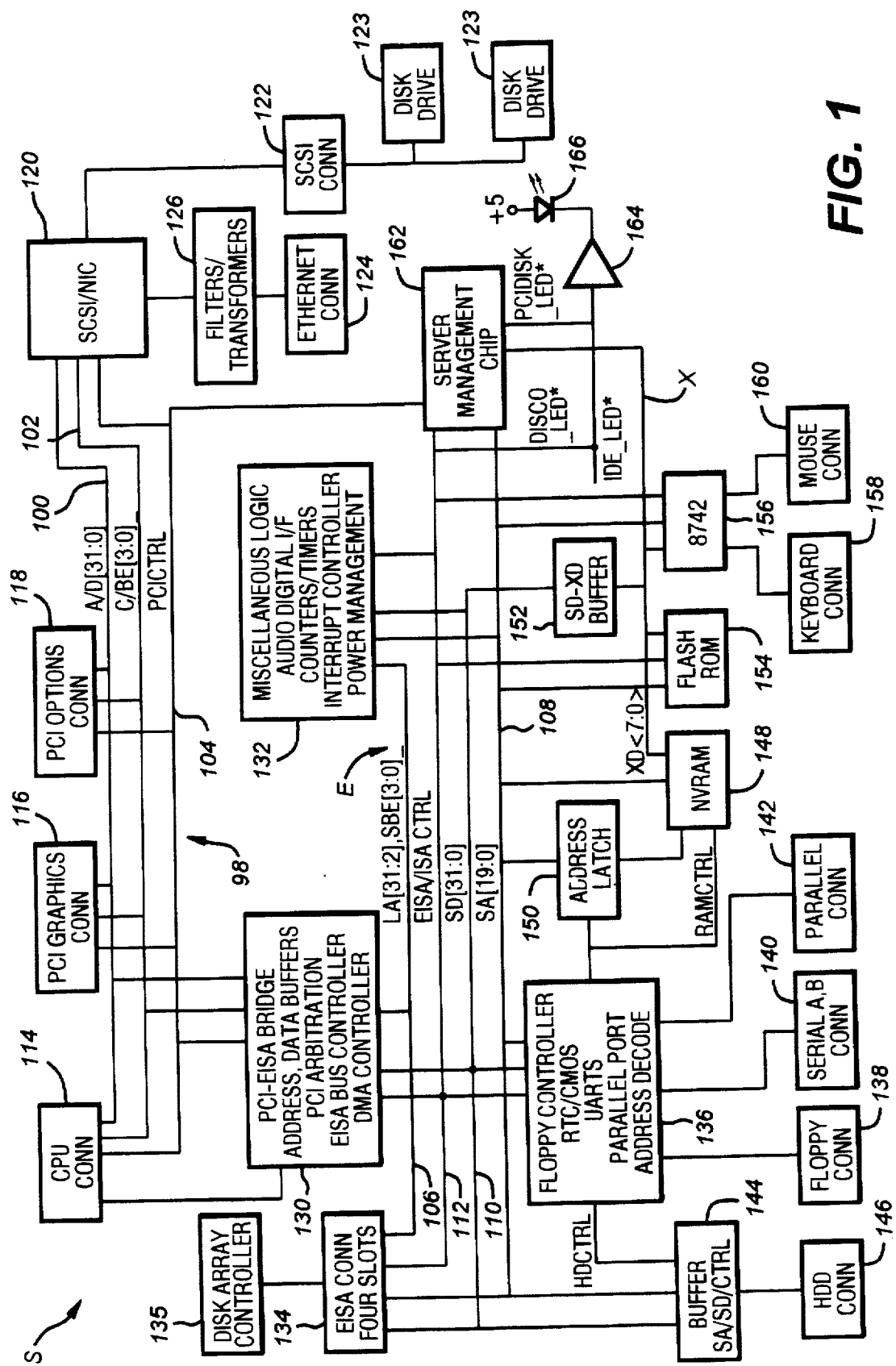
FIG. 1 is a block diagram of a system board including an arbiter according to the present invention.

Referring now to FIG. 1, the system board S of a computer system according to the present invention is shown. In the preferred embodiment, the system board contains circuitry and slots for receiving interchangeable circuit boards. In the preferred embodiment, there are two primary buses located on the system board S. The first bus is the PCI or Peripheral Component Interconnect bus 98 which includes address/data portion 100, control and byte enable portion 102 and control signal portion (PCICTRL) 104. The second primary bus on the system board S is the EISA bus E. The EISA bus E includes LA address portion 106, SA address portion 108, SD data portion 110 and EISA/ISA control signal portion 112. The PCI and EISA buses 98 and E form the backbones of the system board S.

Figure 2:
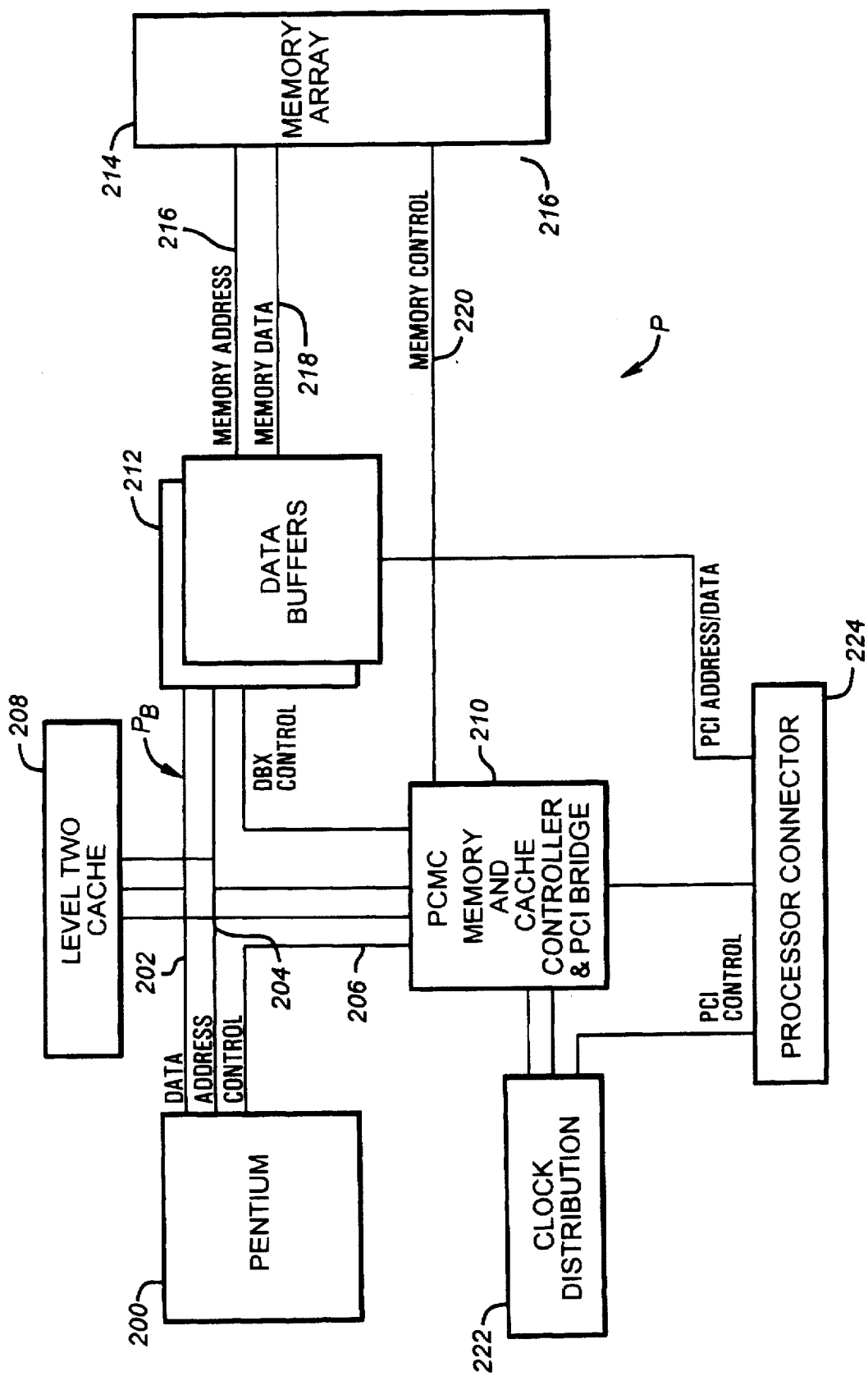
FIG. 2 is a block diagram of a processor board for use with the system board of FIG. 1.
Figure 3:
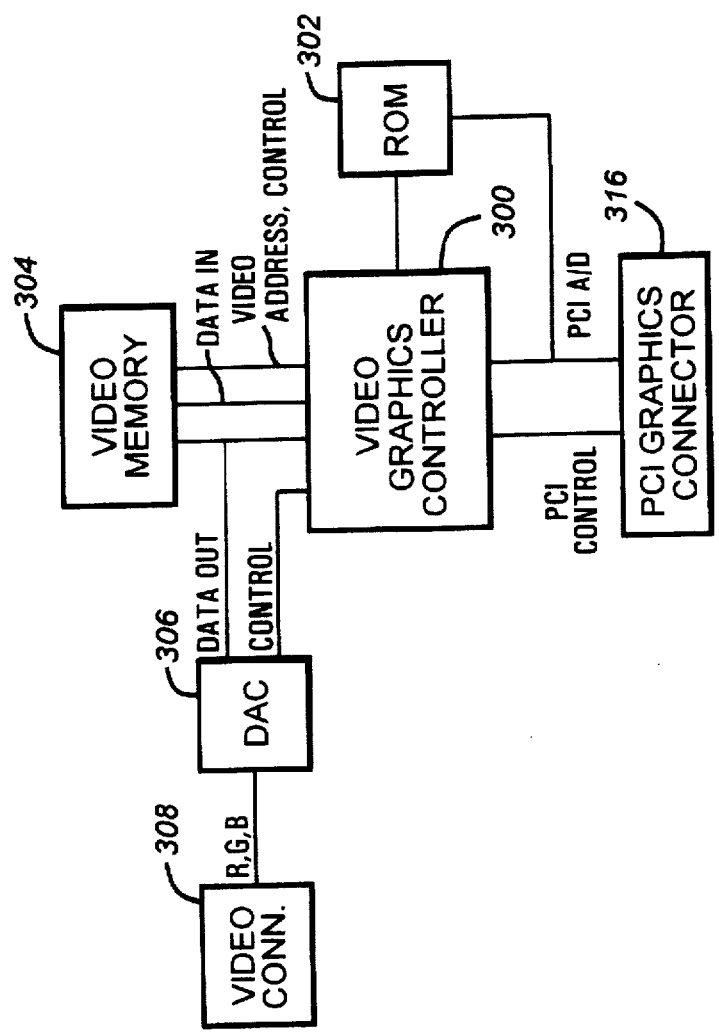
FIG. 3 is a block diagram of a video graphics controller board for use with the system board of FIG. 1.

A CPU connector 114 is connected to the PCI bus 98 to receive interchangeable processor cards, such as the one shown in FIG. 2. A PCI graphics connector 116 is connected to the PCI bus 98 to receive a video graphics card as shown in FIG. 3. A PCI option connector 118 is also connected to the PCI bus 98 to receive any additional cards designed according to the PCI standard. In addition, a SCSI and network interface (NIC) controller 120 is connected to the PCI bus 98. Preferably the controller 120 is a single integrated circuit and includes the capabilities necessary to act as two PCI bus masters, one for the SCSI portion and one for the NIC portion, and a PCI bus slave and the circuitry to act as a SCSI controller and an Ethernet interface. A SCSI connector 122 is connected to the controller 120 to allow connection of various SCSI devices, such as hard disk drives 123 and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus 98 and the EISA bus E. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. The miscellaneous system logic chip 132 contains counters and timers as conventionally present in personal computer systems, an interrupt controller for both the PCI and EISA buses 98 and E and power management logic, as well as other miscellaneous circuitry. A series of four EISA slots 134 are connected to the EISA bus E to receive ISA and EISA adapter cards. In FIG. 1, an EISA disk array controller 135 is installed in one of the EISA slots 134. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive. A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

A server management chip 162 is connected to the control and address portions 112 and 108 of the EISA bus E, the X bus X, and the control portion 104 of the PCI bus 98. The server management chip 162 performs various server management functions, but of interest here is the PCI bus disk drive activity circuitry, shown in detail in FIG. 4. The server management chip 162 provides a PCIDISK_LED# signal, which indicates disk drive activity of a PCI-based controller, to a buffer 164. The PCIDISK_LED# signal is provided from an open-collector buffer or from a tristate buffer activated only when a low or true output signal is present. This allows the PCIDISK_LED# signal to be combined with a DISCO_LED# or disk array controller disk activity signal, provided on the EISA bus E from the disk array controller 135, and an IDE_LED# or IDE bus disk activity signal from the hard drive buffer 144 in a wired-OR arrangement. The DISCO_LED# and IDE_LED# signals are developed as described in the background using prior art techniques. The output of the buffer 164 is connected to a hard disk activity LED 166, which is also connected to a power source, such as 5V. The hard disk activity LED 166 is mounted to be readily visible to the user when the computer system S is in use. When any of the PCIDISK_LED#, DISCO_LED# or IDE_LED# signals is asserted low, the disk activity LED 166 is driven, thus providing the desired indication to the user.

Referring now to FIG. 2, a processor board design is shown. In the processor board P of FIG. 2, the CPU or processor 200 is the Pentium processor from Intel, preferably operating at 60 or 66 Mhz externally, and 60, 66, 90 or 100 Mhz internally. The processor 200 provides data, address and control portions 202, 204 and 206 to form a processor bus PB. A level 2 (L2) or external cache memory system 208 is connected to the processor bus PB to provide additional caching capabilities to improve performance of the computer system. A processor cache and memory controller (PCMC) and PCI bridge chip 210, such as the 82434LX chip from Intel Corporation is connected to the control portion 206 and to the address portion 204. The PCMC 210 is connected to the L2 cache 208 as it incorporates the cache controller and therefore controls the operations of the cache memory devices in the L2 cache 208. The PCMC 210 is also connected to control a series of address and data buffers 212. The address and data buffers 212 are those such as the 82433LX from Intel and are utilized to handle memory addressing and memory data to a main memory array 214. The address and data buffers 212 are connected to the processor data portion 202 and processor address portion 204 and receive control signals from the PCMC 210. The address and data buffers 212 provide a memory address bus 216 and a memory data bus 218 to the memory array 214. A memory control signal bus 220 is provided from the PCMC 210. Clock distribution and generation circuitry 222 is associated with the processor card P and is connected to the PCMC 210. A processor connector 224, such as a card edge, is provided to be mateably received by the processor connector 114. The processor connector 224 is connected to the PCMC 210, the address and data buffers 212 and the clock distribution circuitry 222 to provide clocks to the computer system and to provide a PCI interface to allow the processor 200 to access the PCI and EISA buses 98 and E and to allow PCI and EISA bus masters to access the main memory array 214. Alternatively, a 486 class processor could be utilized with the appropriate cache and memory controller and PCI bridge chip and address and data buffers.

Referring now to FIG. 3, an exemplary video graphics adapter is shown. A video graphics controller 300 is connected to a PCI graphics connector 316, which is mateably received in the graphics connector 116. A ROM 302 is connected to the graphics connector 316 and receives control signals from the video graphics controller 300. Video memory 304 is used to store the graphics data and is connected to the video graphics controller 300 and a digital/analog converter (DAC) 306. The video graphics controller 300 controls the operation of the video memory 304, allowing data to be written and retrieved as required. A video connector 308 is connected to the DAC 306. A monitor (not shown) is connected to the video connector 308.

It is noted that the above description of a computer system is provided for completeness and numerous variations could be developed as apparent to those skilled in the art.

Figure 4:
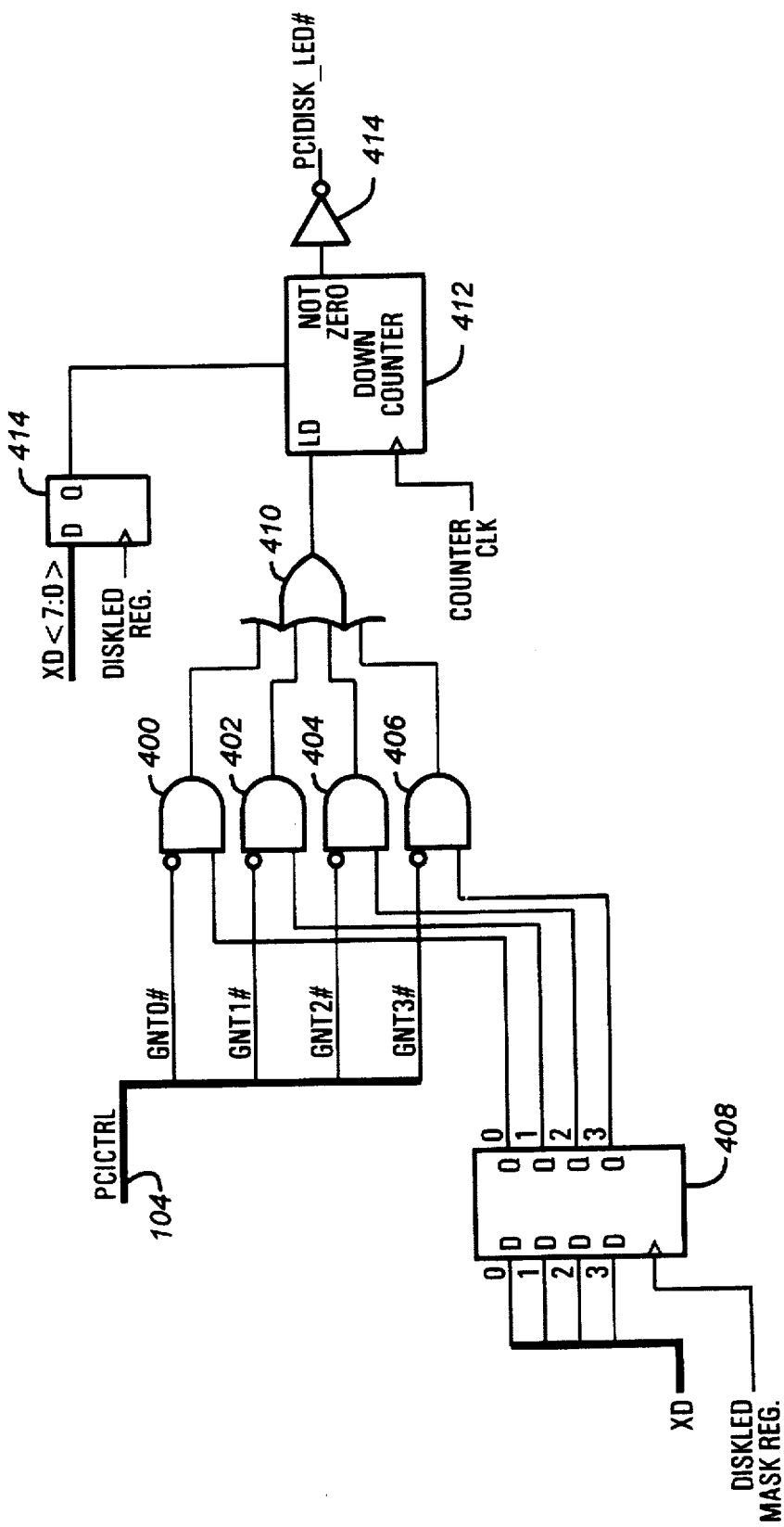
FIG. 4 is a schematic diagram of the PCI hard disk activity circuitry in the server management chip of FIG. 1.

Referring now to FIG. 4, the PCI bus disk drive activity circuitry is shown in detail. The bus master grant lines GNT[3:0]# of the PCI control portion 104 are provided to inverting inputs of AND gates 400, 402, 404 and 406. In the preferred embodiment of the computer system S, there are just four PCI bus master grant lines that could receive the SCSI bus master portion of the controller 120 and therefore only these four lines are utilized. In other embodiments, more grant lines could be provided if necessary. The second input to each of the AND gates 400, 402, 404 and 406 provided by an output of a four bit latch 408. The D inputs to the latch 408 are connected to the four least significant bits of the XD data bus. The clocking or latch signal of the latch 408, is provided by a signal referred to as DISK LED MASK REGISTER and is provided when the CPU is appropriately addressing an arbitrary address assigned to the latch 408.

The outputs of the AND gates 400, 404, 402 and 406 are provided as the four inputs to an OR gate 410. The output of the OR gate 410 is provided to the load input of a down counter 412. The parallel load data values of the counter 412 are provided by the output of a register 414, which receives at its D inputs the XD[7:0] lines, which values are latched in based on a DISK LED REGISTER signal. The DISK LED REGISTER signal is the signal which indicates that the CPU is accessing or writing data to an arbitrary address of the register 414. The down counter 412 is clocked by a signal referred to as COUNTER CLK. Preferably the COUNTER CLK signal is the OSC signal provided on the EISA control portion 112 divided by 512, but of course any desirable frequency can be used to achieve the desired total time and granularity. The counter 412 has a NOT ZERO output which is at a high or asserted level whenever the counter 412 is any value other than 0. When the counter 412 reaches a value of 0, it stops counting until it is next reloaded from the register 414. The NOT ZERO output is provided to the input of an inverter 414 which provides at its output the PCIDISK_LED# signal. The inverter 414 can be either an open collector or open drain device or can be a tristate buffer which is activated only when the NOT ZERO signal is at a high state.

The preferable value provided to the register 414 is one such that after the counter 412 has been loaded according to the action of the OR gate 410, it does not count down to 0 for a period of at least six msec. This is to allow the user sufficient time to perceive that the operation has been performed as the actual transfer operations may occur too quickly to be perceived by the user.

The values in the register 408 are mask values, as seen by the operation of the AND gates 400, 402, 404 and 406, such that if any of those particular values is set to 0, the particular grant line from the PCI control portion 104 will not activate or reload the counter 412. During initialization and set-up of the computer system S, the software will have determined the bus master pair or grant line associated with the SCSI bus master portion of the controller 120 and will program the bits associated with all other grant lines to a mask state of 0, so that only that particular bus master channel or grant line will be used to activate the counter 412. If a bus mastering disk drive controller is located in the option connector 118, the grant line associated with that controller would also be utilized by setting the mask value to a 1 and the two grant lines will be used for activity indication. Thereafter, when any activity is provided from the SCSI bus master portion of the controller 120, the grant line will be activated, which will then trigger the down counter 412 to provide a pulse of the desired period on the PCIDISK_LED#. In this manner whenever there is bus master activity on the SCSI bus over the PCI bus 98, the disk activity LED 166 is activated and the user can perceive this operation. As the SCSI bus master portion of the controller 120 is active primarily only during data transfers between the PCI bus 98 and the disk drives 123 on the SCSI bus, this is a valid indicator of hard disk drive activity. Therefore, using the circuitry of FIG. 4, no actual connection to the hard disk drive 123 is required and yet generic PCI bus and SCSI bus operations and adaptors can be utilized to control the hard disk drives.

While the preferred embodiment utilizes the PCI bus grant lines, other lines indicative of data transfer operations of a hard disk controller could be utilized, such as the MAKn or master acknowledge lines or the DACKn or DMA acknowledge lines in the EISA bus if the controller utilizes those lines. If the particular bus provides a grant indication by providing an encoded grant value, the latch 408 will contain the desired grant value and the AND gates 400–406 and OR gate 410 would be replaced by a comparator connected to the bus grant lines and the latch 408 with the equal output being provided to the load input of the counter 412. Further, while the preferred embodiment uses a SCSI bus controller, an IDE disk drive controller could similarly be used, thus simplifying wiring in IDE cases and allowing more drives to be controlled and yet have the drive LED activated.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system comprising:
    a processor;
    a plurality of input/output controller devices, one of said input/output controller devices being a hard disk controller;
    a hard disk drive connected to said hard disk controller;
    a bus having a plurality of lines;
    wherein said input/output controller devices being coupled to said bus and said plurality of lines carry data transfer operation signals indicating data transfer operations by said controller devices, one of the lines on said bus being associated with said hard disk controller; and
    a disk drive activity indication circuit comprising:
        a mask value register having mask register output signals for individually selecting and masking of each of the plurality of data transfer operation indication signals;

a mask enable circuit for setting said mask register output signals corresponding to data transfer operation signals on lines other than the line to said hard disk controller to indicate a masking operation;

said mask enable circuit further setting the mask register output signal corresponding to a data transfer operation signal on said line to said hard disk controller to indicate no masking operation;

a masking circuit for receiving each of the plurality of data transfer operation signals from said bus and the mask register output signals from said mask value register;

said masking circuit forming output signals masking an assertion of the data transfer operation signals based on said mask register output signals;

said masking circuit further providing the masked output signals so formed for each of the plurality of data transfer operation signals;

an output activity circuit for receiving the masked output signals and providing an output activity signal whenever any of the masked output signals is received;

a disk output activity circuit receiving the output activity signal and providing a disk output activity signal of at least a predetermined period in response thereto; and a disk output activity indicator for receiving the disk output activity signal and providing a visual indication of disk drive activity.

2. A computer system comprising:

a processor;

a plurality of input/output controller devices;

a memory drive connected to one of said input/output controller devices;

a bus having a plurality of lines;

wherein said input/output controller devices being coupled to said bus and said plurality of lines carry data transfer operation signals indicating data transfer operations by said controller devices, one of the lines on said bus being associated with said memory drive input/output controller; and a memory drive activity indication circuit comprising:

a mask value register having mask register output signals for individually selecting and masking of each of the plurality of data transfer operation indication signals;

a mask enable circuit for setting said mask register output signals corresponding to data transfer operation signals on lines other than the line to said memory drive input/output controller to indicate a masking operation;

said mask enable circuit further setting the mask register output signal corresponding to a data transfer operation signal on said line to said memory drive input/output controller to indicate no masking operation;

a masking circuit for receiving each of the plurality of data transfer operation signals from said bus and the mask register output signals from said mask value register;

said masking circuit forming output signals masking an assertion of the data transfer operation signals based on said mask register output signals;

said masking circuit further providing the masked output signals so formed for each of the plurality of data transfer operation signals;

an output activity circuit for receiving the masked output signals and providing an output activity signal whenever any of the masked output signals is received;

a memory drive output activity circuit receiving the output activity signal and providing a memory drive output activity signal of at least a predetermined period in response thereto; and a memory drive output activity indicator for receiving the memory drive output activity signal and providing a visual indication of memory drive activity.

3. The computer system of claim 2, wherein:
said memory drive comprises a hard disk drive.

4. The computer system of claim 2, wherein:
said memory drive comprises a CD-ROM drive.

5. The computer system of claim 2, wherein:
at least one of said input/output controller devices comprises a SCSI bus controller.

6. The computer system of claim 2, wherein:
at least one of said input/output controller devices comprises an IDE disk drive controller.

7. The computer system of claim 2, wherein the plurality of data transfer indication operation signals are bus master grant signals.

8. The computer system of claim 2, wherein said masking circuit includes an AND gate for each of the plurality of data transfer operation indication signals.

9. The computer system of claim 2, wherein said visual indication includes a light emitting diode.

10. The computer system of claim 2, wherein said memory drive output activity circuit includes a loadable down counter and a register containing a value representing said predetermined period, said register connected to said counter to allow said value to be loaded into said counter when said output activity signal is received.

11. The computer system of claim 7, wherein the bus is a PCI bus.

12. The computer system of claim 8, wherein said output activity circuit is an OR gate.

* * * * *